United States Patent
Tang (10) Patent No.: US 11,265,764 B2
(45) Date of Patent: Mar. 1, 2022

(54) RESOURCE RESERVATION METHOD AND DEVICE, AND COMPUTER STORAGE MEDIUM

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/944,139

(22) Filed: Jul. 30, 2020

(65) Prior Publication Data
US 2020/0367113 A1 Nov. 19, 2020

Related U.S. Application Data

(63) Continuation of application No. PCT/CN2018/075254, filed on Feb. 5, 2018.

(51) Int. Cl.
| | |
|---|---|
| *H04W 28/26* | (2009.01) |
| *H04W 4/40* | (2018.01) |
| *H04W 72/02* | (2009.01) |
| *H04W 80/02* | (2009.01) |

(Continued)

(52) U.S. Cl.
CPC .......... *H04W 28/26* (2013.01); *H04W 4/40* (2018.02); *H04W 72/02* (2013.01); *H04W 80/02* (2013.01); *H04W 80/08* (2013.01); *H04W 92/18* (2013.01)

(58) Field of Classification Search
CPC ....... H04W 28/26; H04W 4/40; H04W 72/02; H04W 80/02; H04W 80/08; H04W 92/18; H04W 72/0406; H04W 4/70; H04W 72/10; H04W 4/44; H04W 4/46; H04W 28/16

See application file for complete search history.

(56) References Cited

U.S. PATENT DOCUMENTS

| | | | |
|---|---|---|---|
| 10,736,128 B2 * | 8/2020 | Lee | .......... H04W 4/40 |
| 11,057,910 B2 * | 7/2021 | Khoryaev | ......... H04W 72/1284 |
| 2013/0148566 A1 | 6/2013 | Doppler | |

(Continued)

FOREIGN PATENT DOCUMENTS

| | | |
|---|---|---|
| CN | 104640145 A | 5/2015 |
| CN | 105307107 A | 2/2016 |

(Continued)

OTHER PUBLICATIONS

English translation of the Written Opinion of the International Search Authority in the international application No. PCT/CN2018/075254, dated Oct. 25, 2018.

Supplementary European Search Report in the European application No. 18903135.4, dated Nov. 27, 2020.

(Continued)

*Primary Examiner* — Afshawn M Towfighi
(74) *Attorney, Agent, or Firm* — Perkins Coie LLP (57) ABSTRACT

A resource reservation method and device, and a computer storage medium are provided. The method includes: a first terminal sending a first channel, where the first channel is a physical sidelink control channel (PSCCH), and the PSCCH includes information of a resource selected by the first terminal; the first terminal receives a second channel from a second terminal, and determines, based on the second channel, whether the first terminal can use the selected resource.

14 Claims, 4 Drawing Sheets

(51) Int. Cl.
*H04W 80/08* (2009.01)
*H04W 92/18* (2009.01)

(56) References Cited

U.S. PATENT DOCUMENTS

| | | | |
|---|---|---|---|
| 2017/0188391 A1* | 6/2017 | Rajagopal | H04W 28/0284 |
| 2018/0132254 A1 | 5/2018 | Chae et al. | |
| 2018/0206260 A1* | 7/2018 | Khoryaev | H04W 72/1263 |
| 2019/0053267 A1* | 2/2019 | Kim | H04W 72/1242 |
| 2020/0015255 A1 | 1/2020 | Khoryaev et al. | |
| 2020/0196365 A1* | 6/2020 | Tang | H04W 4/70 |
| 2021/0028891 A1* | 1/2021 | Zhou | H04W 72/0446 |

FOREIGN PATENT DOCUMENTS

| | | |
|---|---|---|
| CN | 106470492 A | 3/2017 |
| CN | 106550318 A | 3/2017 |
| CN | 106792885 A | 5/2017 |
| CN | 107534982 A | 1/2018 |
| EP | 3355643 A1 | 8/2018 |
| WO | 2015021185 A1 | 2/2015 |
| WO | 2016163848 A1 | 10/2016 |
| WO | 2017026973 A1 | 2/2017 |

OTHER PUBLICATIONS

3GPP TSG RAN WG1 Meeting #89, R1-1709000, Ericsson, "Short TTI for increasing the reliability for PCS-based V2X", mailed on May 14, 2017.
International Search Report in the international application No. PCT/CN2018/075254, dated Oct. 25, 2018.
Office Action of the Indian application No. 202027036737, dated Aug. 31, 2021. 5 pages with English translation.
First Office Action of the Canadian application No. 3090344, dated Aug. 31, 2021. 6 pages.
First Office Action of the Chinese application No. 202010998158.8, dated Oct. 15, 2021. 13 pages with English translation.
First Office Action of the European application No. 18903135.4, dated Oct. 18, 2021. 6 pages.
Panasonic, Radio resource selection behaviour for sensing and semi-persistent transmissions, 3GPP TSG-RAN WG2#95 R2-164849, 3GPP, Aug. 12, 2016. 3 pages.
Lenovo, SA content for V2V, 3GPP TSG-RAN WG1#85 R1-164636, 3GPP, May 13, 2016. 6 pages.
Ericsson, QoS enhancements for sidelink and Uu, 3GPP TSG-RAN WG2#93bis R2-162817, 3GPP, Apr. 1, 2016. 5 pages.
First Office Action of the Japanese application No. 2020-542276, dated Dec. 10, 2021. 8 pages with English translation.

* cited by examiner

A first terminal sends a first channel, the first channel being used for determining information of a resource selected by the first terminal — 501

RESOURCE RESERVATION METHOD AND DEVICE, AND COMPUTER STORAGE MEDIUM

CROSS REFERENCE TO RELATED APPLICATION

This application is a continuation of International Patent Application No. PCT/CN2018/075254 filed on Feb. 5, 2018, the disclosure of which is hereby incorporated by reference in its entirety.

BACKGROUND

A Sidelink (SL) transmission technology based on Long Term Evolution (LTE)-Device to Device (D2D) is adopted for a Vehicle-to-Everything (V2X) system. Unlike a conventional LTE system in which communication data is received or sent through a base station, the V2X system adopts a D2D direct communication manner so as to achieve higher spectrum efficiency as well lower transmission delay.

In the 3rd Generation Partnership Project (3GPP) Release 14 (Rel-14), a V2X technology is standardized, and two transmission modes are defined: a mode 3 and a mode 4. In the mode 3, a transmission resource of a terminal is allocated by a base station. In the mode 4, the terminal determines the transmission resource in a combined manner of sensing and reservation.

For the mode 4, the terminal selects the resource in a selection window based on a sensing result obtained in a sensing window. The present manner of resource selection and resource reservation may prevent conflict among transmission resources to some extent. However, in a case where geographical locations of two User Equipment (UEs) are close to each other, available resource sets obtained by the UEs through the sensing manner may be very similar; and thus it is very possible for the UEs to select the same transmission resource, resulting in conflict between transmission resources.

SUMMARY

The disclosure relates to the technical field of wireless communications, and in particular to a resource reservation method and device, and a computer storage medium.

A resource reservation method is provided by embodiments of the disclosure, which may include the following operations. A first terminal sends a first channel, where the first channel is a physical sidelink control channel (PSCCH), and the PSCCH includes information of a resource selected by the first terminal. The first terminal receives a second channel from a second terminal; and determines, based on the second channel, whether the first terminal can use the selected resource.

A resource reservation device is provided by embodiments of the disclosure, which may include a processor, a memory configured to store instructions executable by the processor, and a transceiver. The processor is configured to control the transceiver to: send a first channel, where the first channel is a PSCCH and the PSCCH includes the information of the resource selected by the first terminal; receive a second channel from a second terminal; and determine, based on the second channel, whether the first terminal can use the selected resource.

A computer storage medium is provided by the embodiments of the disclosure, which may store a computer executable instruction; and the computer executable instruction, when being executed by a processor, enables the processor to implement the above-mentioned resource reservation method.

BRIEF DESCRIPTION OF THE DRAWINGS

The accompanying drawings are described here to provide a further understanding of the disclosure, and form a part of the disclosure. The schematic embodiments and description of the disclosure are adopted to explain the disclosure, and do not form improper limits to the disclosure. In the drawings.

DETAILED DESCRIPTION

For making the characteristics and technical contents of the embodiments of the disclosure understood in more detail, implementation of the embodiments of the disclosure will be described below in combination with the drawings in detail. The drawings are only adopted for description as references and not intended to limit the embodiments of the disclosure.

For ease of understanding the technical solutions in the embodiments of the disclosure, a mode 3 and a mode 4 in V2X are respectively explained and described hereinafter.

Figure 1:
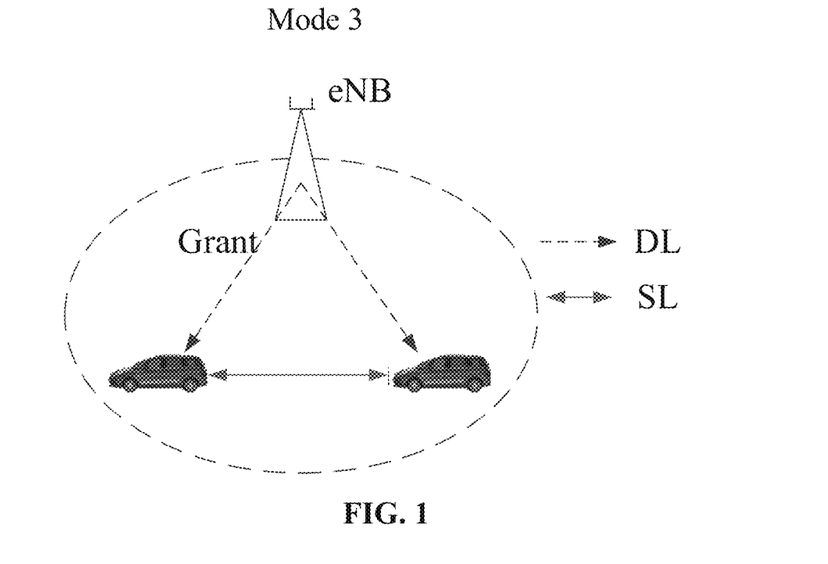
FIG. 1 is a schematic diagram of a scenario of a mode 3 in V2X.

For the mode 3, as shown in FIG. 1, a transmission resource of a vehicle terminal is allocated by a base station (such as an Evolved NodeB (eNB) in LTE). Specifically, the base station transmits a control message for indicating a grant resource to the vehicle terminal through a Down Link (DL), and then the vehicle terminal sends data in an SL according to the resource allocated by the base station. In the mode 3, the base station may allocate a resource for single transmission to the vehicle terminal, or may also allocate a resource for semi-persistent transmission to the terminal.

Figure 2:
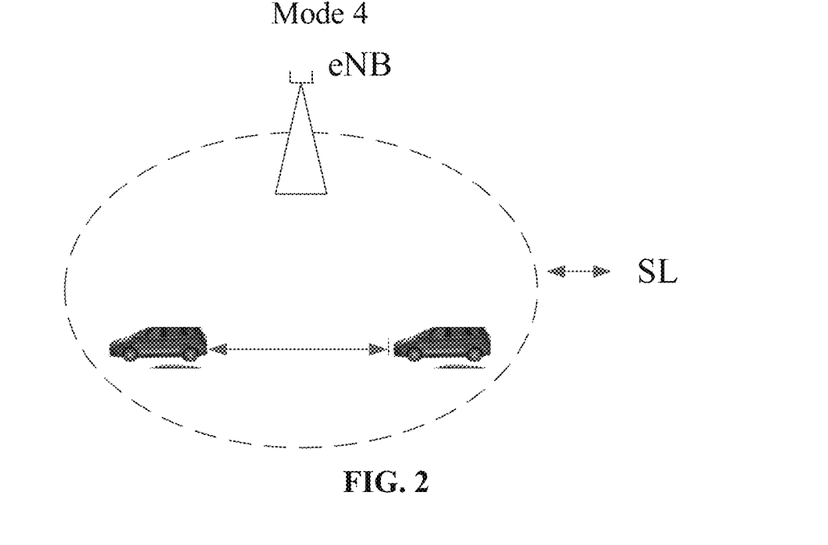
FIG. 2 is a schematic diagram of a scenario of a mode 4 in V2X.

For the mode 4, as shown in FIG. 2, the vehicle terminal adopts a combined transmission manner of sensing and reservation. The vehicle terminal acquires an available transmission resource set in a resource pool through a sensing manner, and the vehicle terminal randomly selects a resource from the transmission resource set for data transmission. Since a service in a V2X system is periodic, the vehicle terminal usually adopts a semi-persistent transmission manner, namely the vehicle terminal, after selecting a transmission resource, may continuously using the resource in multiple transmission cycles, so that probabilities of resource reselection and resource conflict are reduced. The vehicle terminal may carry information for reserving a resource for next transmission in control information transmitted currently, such that another terminal may detect the control information of the vehicle terminal to determine whether the resource is reserved for and used by the vehicle terminal, thereby achieving reduction of resource conflicts.

It is to be noted that the mode 3 is used to indicate that the transmission resource of the vehicle terminal is allocated by the base station, and the mode 4 is used to indicate that the transmission resource of the vehicle terminal is selected independently in LTE-V2X. In New Radio-Vehicle-to-Everything (NR-V2X), a new transmission mode may be defined, and is not defined by the disclosure.

Figure 3:
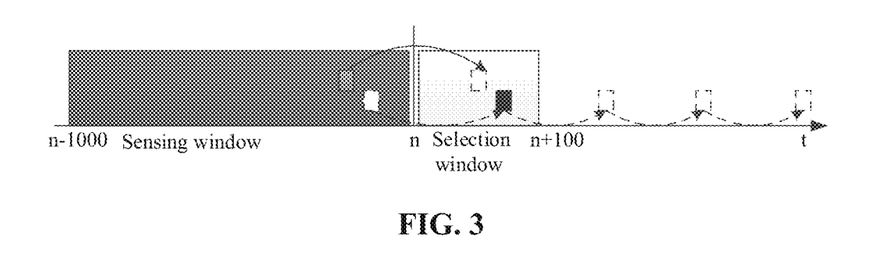
FIG. 3 is a first schematic diagram illustrating that a terminal performs sensing and selection of transmission resource.

FIG. 3 is a first schematic diagram illustrating that a terminal performs sensing and selection of a transmission resource. As shown in FIG. 3, for each sidelink process, when a new data packet reaches at a moment n for resource selection, the terminal selects a resource in a selection window of [n+T1, n+T2] ms according to a sensing result obtained in the past one second (i.e., a sensing window of [n−1000, n] ms), where T1≤4, and 20≤T2≤100. In this example, the process that the terminal selects the resource in the selection window is as follows.

It is to be noted that the following merely provides main steps that the terminal selects and reserves the resource in a sensing manner and the specific steps may be referred to the technical specification 3GPP 36.213 in Version 14.3.0.

The terminal takes all available resources in the selection window as a set A, and the terminal performs the following exclusion operations 1-3 on the resources in the set A.

1. If the terminal does not sense available resources on part of subframes in the sensing window, resources of subframes, corresponding to the part of subframes, in the selection window are excluded.

2. If the terminal detects a PSCCH in the sensing window, where a PSSCH corresponding to the PSCCH has a Reference Signal Receiving Power (RSRP) higher than a threshold value, and there is a resource conflict between a next transmission resource reserved in the PSCCH and data to be sent by the terminal, the reserved transmission resource is excluded from the set A.

3. The terminal performs detection of Sidelink Received Signal Strength Indication (S-RSSI) on remaining resources in the set A, ranks the resources according to their energy in a descending order from high to low, and puts 20% of resources (i.e., the number relative to that of the resources in the set A) having relative lower energy into a set B.

Herein, if the number of the remaining resources in the set A is smaller than 20% of the total number of resources, the terminal may increase the threshold of the RSRP of PSSCH by 3 dB, and repeat execution of the steps 1-2, till the number of the remaining resources in the set A is greater than or equal to 20% of the total number of resources.

4. The terminal equiprobably selects one resource from the set B for data transmission.

When the terminal selects one resource for transmission, the terminal may continuously use and reserve the resource for Cresel times; where Cresel is decreased by 1 every time the data is transmitted, and when the Cresel decreases to 0, the terminal randomly generates a random number between [0,1] and compares the random number with a parameter probResourceKeep (hereinafter P_resKeep). If the randon number is greater than the P_resKeep, the terminal reselects a resource; and if the random number is smaller than or equal to the P_resKeep, the terminal continuously uses the resource and resets the Cresel.

Figure 4:
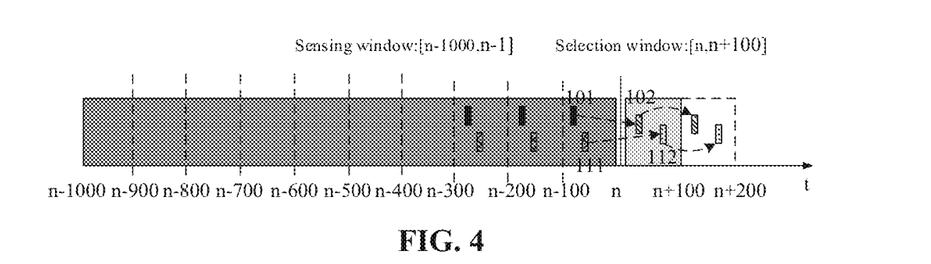
FIG. 4 is a second schematic diagram illustrating that a terminal performs sensing and selection of transmission resource.

FIG. 4 is a second schematic diagram illustrating that a terminal performs sensing and selection of a transmission resource. In LTE-V2X, the sensing window has a time range of [n−K*T, n−1] ms, and the selection window has a time range of [n, n+T] ms, wherein n is a moment when service data reaches, or a moment when a high layer generates the service data. In an example, T=100 ms and K=10, then the sensing window has a time range of [n−1000, n−1] ms and the selection window has a time range of [n, n+100] ms. UE1 and UE2 perform resource sensing in the sensing window and select an appropriate resource in the selection window.

As shown in FIG. 4, both the UE1 and the UE2 have a transmission period of 100 ms. The UE1 and the UE2 may use a same transmission resource repeatedly in multiple transmission periods, for example, the UE1 uses a same transmission resource (resource 101) in 10 transmission periods prior to a moment n, and the UE2 uses another same transmission resource (resource 111) in 10 transmission periods prior to the moment n. The UE1 performs resource sensing in the sensing window [n−1000, n−1] ms, and selects a resource 102 in the selection window [n, n+100] ms based on a sensing result; the UE2 performs resource sensing in the sensing window [n−1000, n−1] ms, and selects a resource 112 in the selection window [n, n+100] ms based on its sensing result; and the UE1 and the UE2 use the selected transmission resource continuously in subsequent X (for example, X=10) periods.

In some cases, the transmission resources selected by the UE1 and the UE2 may overlap, for example, the resource 102 overlaps or partially overlaps with the resource 112. As a result, there is a transmission conflict between the UE1 and the UE2 all the time in the subsequent X transmission periods, so that the detection probabilities of other users are reduced, and the UE1 and the UE2 cannot sense the existence to each other. In view of this, the embodiments of the disclosure provide a new resource reservation method.

Figure 5:
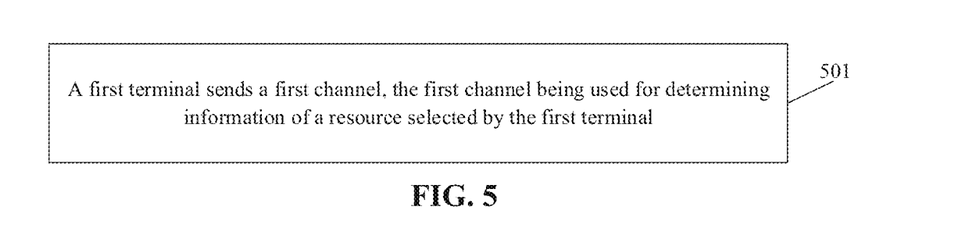
FIG. 5 is a flowchart schematic diagram of a resource reservation method according to embodiments of the disclosure.

FIG. 5 is a flowchart schematic diagram of a resource reservation method according to embodiments of the disclosure. As shown in FIG. 5, the resource reservation method includes the following steps.

At 501, a first terminal sends a first channel, the first channel being used for determining information of a resource selected by the first terminal.

In an embodiment of the disclosure, the first terminal selects the resource in the following manners. The first terminal senses a resource in a first sensing window and selects a resource in a first selection window based on a sensing result, the first sensing window corresponding to a first time range, and the first selection window corresponding to a second time range. The first time range is located prior to the second time range, and the second time range is located prior to a target moment, and the target moment indicates a moment at which service data reaches, or a time at which a high layer generates the service data.

In an optional implementation, the operation that the first terminal selects the resource in the first selection window is as follows.

The first terminal takes all available resources in the first selection window as a set A, and the first terminal performs an exclusion operation on the resource in the set A. Main steps for excluding the resource are given below exemplarily.

1. If the first terminal does not sense available resources on some time units in the first sensing window, resources on time units, corresponding to these time units, in the selection window are excluded. Herein, the time unit may be a subframe (i.e., 1 ms), and will not be limited thereto in the embodiments of the disclosure. The time unit may further be other durations, such as a slot or a short Transmission Time Interval (sTTI).

2. If the first terminal detects a PSCCH in the first sensing window, where a PSSCH corresponding to the PSCCH has an RSRP higher than a threshold value, and there is a resource conflict between a next transmission resource reserved in the PSCCH and data to be sent by the terminal, the reserved transmission resource is excluded from the set A.

3. The first terminal performs S-RSSI detection on remaining resources in the set A, sorts the resources according to their energy in a descending order from high to low, and puts Q% of resources (i.e., the number relative to that of the resources in the set A) having a lower energy into a set B, for example, Q=20.

Herein, if the number of the remaining resources of the set A is smaller than Q% of the total number of resources, the first terminal may increase the threshold (such as 3 dB) of the PSSCH-RSRP, and repeat execution of the steps 1-2, till the number of remaining resources in the set A is greater than or equal to Q% of the total number of resources.

4. The first terminal selects one resource from the set B in an equiprobable manner for data transmission.

In an embodiment of the disclosure, the first time range corresponding to the first sensing window is [n−(K+1)*T, n−T−1] subframe or time slot, wherein n is the target moment, T is a first period, and K is a positive integer. The second time range corresponding to the first selection window is [n−T1, n−T2] subframe or time slot, wherein n is the target moment, T1 and T2 are an integer greater than or equal to 0 and smaller than or equal to the T, and T1 is greater than T2.

In an implementation manner, the first period is determined via the following manners.

In a first manner, the first terminal determines the first period based on a transmission period of the service data.

In a second manner, the first terminal determines the first period based on configuration information, and the configuration information may be pre-configured information or information configured by a network.

Figure 6:
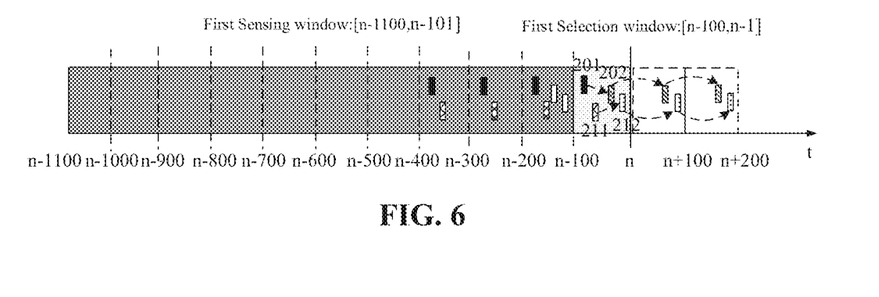
FIG. 6 is a schematic diagram for sensing and selecting according to embodiments of the disclosure.

Referring to FIG. 6, in an example, T=100 ms, K=10, T1=100 ms and T2=0 ms, then the time range of the first sensing window is [n−1100, n−101] ms, the time range of the first selection window is [n−100, n] ms, and the first terminal may be UE1 or UE2. The UE1 and the UE2 perform resource sensing in the sensing window and select an appropriate resource in the selection window. Herein, the UE1 and the UE2 of which the first sensing window and the first selection window are the same are used as an example. It should be understood that the UE1 and the UE2 may also have different first sensing windows and/or different first selection windows.

As shown in FIG. 6, both the UE1 and the UE2 have a transmission period of 100 ms (it should be understood that the UE1 and the UE2 may also use different transmission periods). The UE1 and the UE2 may use a same transmission resource repeatedly in multiple transmission periods, for example, the UE1 uses a same transmission resource (resource 201) in 10 transmission periods before a moment n, and the UE2 uses a same transmission resource (resource 211) in 10 transmission periods before the moment n. The UE1 performs resource sensing in the sensing window [n−1100, n−101] ms, and selects a resource 202 in the selection window [n−100, n] ms based on a sensing result; the UE2 performs resource sensing in the sensing window [n−1100, n−101] ms, and selects a resource 212 in the selection window [n−100, n] ms based on the sensing result; and the UE1 and the UE2 may use the selected transmission resource continuously in subsequent X (for example, X=10) periods.

In an embodiment of the disclosure, the first terminal carries information of the selected to-be-used resource in data transmission, which may be specifically implemented as follows.

In the first manner, the first terminal sends a first channel, the first channel being a PSCCH including information of a resource selected by the first terminal.

For example, the PSCCH carries, through first SCI, the information of the resource selected by the first terminal.

In the second manner, the first terminal sends a first channel, the first channel being a PSSCH including information of a resource selected by the first terminal.

For example, the PSSCH carries, through an MAC CE, the information of the resource selected by the first terminal.

In the third manner, the first terminal sends a first channel, the first channel being a PSCCH including first indication information, where the first indication information is used for indicating that a PSSCH corresponding to the PSCCH includes the information of the resource selected by the first terminal.

For example, the PSCCH carries the first indication information via second SCI.

In an implementation, the first terminal sends the first channel in a last transmission period before a target moment. In an example, as shown in FIG. 6, the UE1 and the UE2 carry the information of the selected to-be-used resource via the PSCCH and/or the PSSCH in the transmission period [n−100, n] ms.

In an embodiment of the disclosure, the first terminal may detect, based on PSCCHs and/or PSSCHs sent by the other terminals, whether its transmission resources conflicts with transmission resources of other terminals. Specifically, the first terminal receives a second channel sent by a second terminal, and determines, based on the second channel, whether the first terminal may use a resource selected in the first selection window; and determines, if a resource selected by the first terminal overlaps with a resource selected by the second terminal, that there is conflict between the transmission resources. The conflict of the transmission resources may be prevented via the following manners:

In a first manner, the transmission resource conflict is prevented according to a user priority. When the service priority of the first terminal is higher than that of the second terminal, the first terminal can use the resource selected by the first terminal to transmit data or signaling. When the service priority of the first terminal is lower than that of the second terminal, the first terminal cannot use the resource selected by the first terminal to transmit data or signaling.

It is to be noted that the service priority is adopted as an example for description in this embodiment. The disclosure may also prevent the conflict of the transmission resources based on other priorities, for example, based on a ProSe Per-Packet Priority (PPPP), or other information capable of distinguishing the user or service priority, which is not defined by the disclosure.

In a second manner, the transmission resource conflict is prevented according to a time sequence in which the resource is selected. If the service priority of the first terminal is the same as that of the second terminal, when time of the first terminal for sending the first channel is earlier than that of the second terminal for sending the second channel, the first terminal can use the resource selected by the first terminal to transmit data or signaling; and when the time of the first terminal for sending the first channel is later than that of the second terminal for sending the second channel, the first terminal cannot use the resource selected by the first terminal to transmit data or signaling.

In an implementation, when the first terminal cannot use the resource selected by the first terminal to transmit data or signaling, the first terminal re-performs resource sensing and resource selection.

According to the embodiments of the disclosure, a first terminal sends a first channel, the first channel being used for determining information of a resource selected by the first terminal. Through the technical solutions provided by the embodiments of the disclosure, the information of the resource selected by the first terminal is carried through a PSCCH and/or a PSCCH, and thus a probability that a conflict occurs between transmission resources of terminals is reduced.

Figure 7:
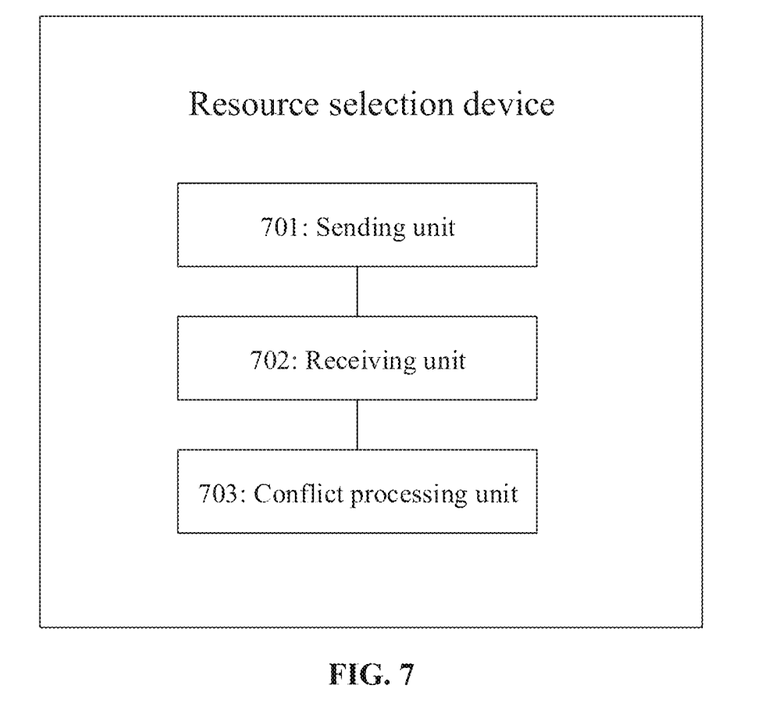
FIG. 7 is a structural schematic diagram of a resource reservation device according to embodiments of the disclosure.

FIG. 7 is a structural schematic diagram of a resource reservation device according to embodiments of the disclosure. As shown in FIG. 7, the resource reservation device includes: a sending unit 701.

The sending unit 701 is configured to send a first channel, the first channel being used for determining information of a resource selected by a first terminal.

In an implementation, the first channel is a PSCCH, and the PSCCH includes the information of the resource selected by the first terminal.

In an implementation, the PSCCH carries, through first SCI, the information of the resource selected by the first terminal.

In an implementation, the first channel is a PSSCH, and the PSSCH includes the information of the resource selected by the first terminal.

In an implementation, the PSSCH carries, through an MAC CE, the information of the resource selected by the first terminal.

In an implementation, the first channel is a PSCCH, the PSCCH includes first indication information used for indicating that a PSSCH corresponding to the PSCCH includes the information of the resource selected by the first terminal.

In an implementation, the PSCCH carries the first indication information through second SCI.

In an implementation, the sending unit 701 is configured to send the first channel in a last transmission period before a target moment, the target moment being a moment at which service data reaches, or a moment at which a high layer generates the service data.

In an implementation, the device further includes: a receiving unit 702, and a conflict processing unit 703.

The receiving unit 702 is configured to receive a second channel sent by a second terminal and determine based on the second channel, whether the first terminal can use a resource selected in a first selection window.

The conflict processing unit 703 is configured to determine, if the resource selected by the first terminal overlaps with a resource selected by the second terminal and when a service priority of the first terminal is higher than that of the second terminal, that the first terminal can use the resource selected by the first terminal to transmit data or signaling; and determine, when the service priority of the first terminal is lower than that of the second terminal, that the first terminal cannot use the resource selected by the first terminal to transmit data or signaling.

In an implementation, the conflict processing unit 703 is further configured to determine, if the service priority of the first terminal is the same as that of the second terminal, and when time of the first terminal for sending the first channel is earlier than that of the second terminal for sending the second channel, that the first terminal can use the resource selected by the first terminal to transmit data or signaling; and determine, when the time of the first terminal for sending the first channel is later than that of the second terminal for sending the second channel, that the first terminal cannot use the resource selected by the first terminal to transmit data or signaling.

In an implementation, the device further includes a resource sensing unit, configured to perform, when the first terminal cannot use the resource selected by the first terminal to transmit data or signaling, resource sensing, and a resource selection unit configured to perform resource reselection.

Those skilled in the art should know that functions realized by each unit in the resource reservation device shown in FIG. 7 may be understood with reference to related descriptions about the resource reservation method. The functions of each unit in the resource reservation device shown in FIG. 7 may be realized through a program running in a processor, and may also be realized through a specific logical circuit.

All the technical solutions of the embodiments of the disclosure are not only applied to a V2X system but also applied to other D2D communication systems. The terminal in the embodiments of the disclosure may be a vehicle terminal, a handheld terminal, a Personal Digital Assistant (PDA), a wearable terminal and the like. The network in the embodiments of the disclosure may be an NR network, an LTE network and the like.

When being implemented in form of software functional module and sold or used as an independent product, the resource reservation device of the embodiments of the disclosure may also be stored in a computer-readable storage medium. Based on such an understanding, the technical solutions of the embodiments of the disclosure substantially or parts making contributions to the conventional art may be embodied in form of software product, and the computer software product is stored in a storage medium, including a plurality of instructions configured to enable a computer device (which may be a personal computer, a server, a network device or the like) to execute all or part of the method in each embodiment of the disclosure. The storage medium includes: various media capable of storing program codes such as a U disk, a mobile hard disk, a Read Only Memory (ROM), a magnetic disk or an optical disk. Therefore, the embodiments of the disclosure are not limited to any specific hardware and software combination.

Correspondingly, the embodiments of the disclosure also provide a computer storage medium, in which computer-executable instructions are stored, the computer-executable instructions, when being executed by a processor, enable the processor to implement the resource reservation method of the embodiments of the disclosure.

Figure 8:
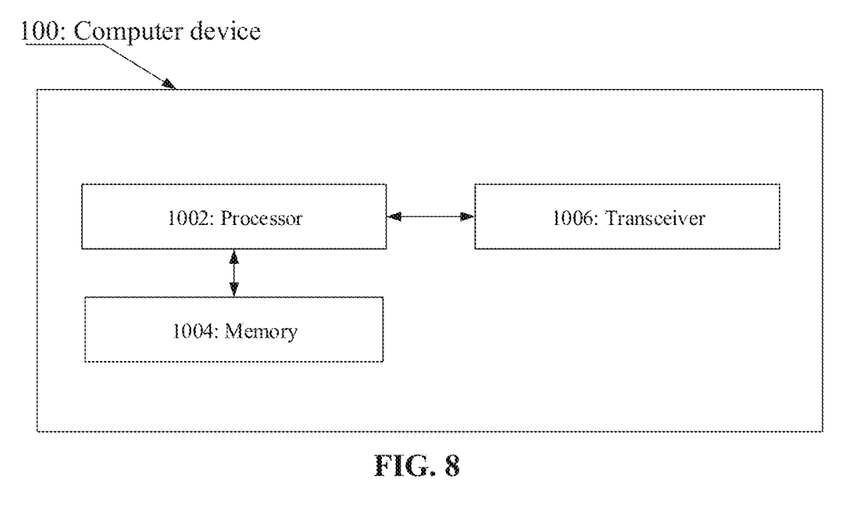
FIG. 8 is a structural schematic diagram of a computer device according to embodiments of the disclosure.

FIG. 8 is a structural schematic diagram of a computer device according to an embodiment of the disclosure. The computer device may be any type of terminal. As shown in FIG. 8, the computer device 100 may include one or more (only one is illustrated in the figure) processors 1002 (the processor 1002 may include, but not limited to, a processing device such as a Micro Control Unit (MCU) or a Field Programmable Gate Array (FPGA)), a memory 1004 configured to store data and a transceiver 1006 configured for a communication function. Those of ordinary skill in the art should know that the structure shown in FIG. 8 is only schematic and not intended to limit the structure of the electronic device. For example, the computer device 100 may further include components more or fewer than the components shown in FIG. 8 or has a configuration different from that shown in FIG. 10.

The memory 1004 may be configured to store a software program of application software and a module, for example, a program instruction/module corresponding to a method in the embodiments of the disclosure. The processor 1002 runs the software program and module stored in the memory 1004, thereby executing various functional applications and data processing, namely implementing the above-mentioned method. The memory 1004 may include a high-speed random access memory and may also include a nonvolatile memory, for example, one or more magnetic storage devices, flash memories or other nonvolatile solid-state memories. In some examples, the memory 1004 may further include a memory arranged remotely relative to the processor 1002 and the remote memory may be connected to the computer device 100 through a network. An example of the network includes, but not limited to, the Internet, an intranet, a local area network, a mobile communication network and a combination thereof.

The transceiver 1006 is configured to receive or send data through a network. A specific example of the network may include a wireless network provided by a communication provider of the computer device 100. In an example, the transceiver 1006 includes a Network Interface Controller (NIC), which may be connected with another network device through a base station, so as to communicate with the Internet. In an example, the transceiver 1006 may be a Radio Frequency (RF) module, configured to communicate with the Internet in a wireless manner.

The technical solutions recorded in the embodiments of the disclosure may be freely combined without conflicts.

In some embodiments provided by the disclosure, it is to be understood that the disclosed method and intelligent device may be implemented in another manner. The device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part of all of the units may be selected according to a practical requirement to achieve the purposes of the solutions of the embodiments.

In addition, each functional unit in each embodiment of the disclosure may be integrated into a second processing unit, each unit may also serve as an independent unit and two or more than two units may also be integrated into a unit. The integrated unit may be implemented in a hardware form and may also be implemented in form of hardware and software functional unit.

The above is only the specific implementation manner of the disclosure and not intended to limit the scope of protection of the disclosure. Any variations or replacements apparent to those skilled in the art within the technical scope disclosed by the disclosure shall fall within the scope of protection of the disclosure.

The invention claimed is:

1. A resource reservation method, comprising:
   sending, by a first terminal, a first channel, wherein the first channel is a physical sidelink control channel (PSCCH), and the PSCCH comprises information of a resource selected by the first terminal;
   receiving, by the first terminal, a second channel from a second terminal; and
   determining, based on the second channel, whether the first terminal can use the selected resource; and
   if the resource selected by the first terminal overlaps with a resource selected by the second terminal, when determining, based on that a service priority of the first terminal is higher than that of the second terminal, that the first terminal can use the resource selected by the first terminal for transmitting data or signaling;
   when determining, based on that the service priority of the first terminal is lower than that of the second terminal, that the first terminal cannot use the resource selected by the first terminal to transmit data or signaling, wherein the service priority is a ProSe Per-Packet Priority (PPPP),
   the method further comprising:
   when the first terminal cannot use the resource selected by the first terminal to transmit data or signaling, performing, by the first terminal, resource sensing and resource reselection.

2. The method of claim 1, wherein the PSCCH carries, through sidelink control information (SCI), the information of the resource selected by the first terminal.

3. The method of claim 1, further comprising:
   if a service priority of the first terminal is the same as that of the second terminal, determining, when time of the first terminal for sending the first channel is earlier than that of the second terminal for sending the second channel, that the first terminal can use the resource selected by the first terminal to transmit data or signaling; or determining, when the time of the first terminal for sending the first channel is later than that of the second terminal for sending the second channel, that the first terminal cannot use the resource selected by the first terminal to transmit data or signaling.

4. The method of claim 1, wherein the first channel is a physical sidelink shared channel (PSSCH), and the PSSCH comprises the information of the resource selected by the first terminal.

5. The method of claim 4, wherein the PSSCH carries, through a Media Access Control (MAC) Control Element (CE), the information of the resource selected by the first terminal.

6. The method of claim 1, wherein sending, by the first terminal, the first channel comprises:
   sending, by the first terminal, the first channel in a last transmission period prior to a target moment, wherein the target moment indicates a moment at which service data reaches, or a moment at which a high layer generates the service data.

7. A resource reservation device, comprising: one or more processors, a memory configured to store instructions executable by the one or more processors, and a transceiver, wherein
   the one or more processors are configured to:
   control the transceiver to send a first channel, wherein the first channel is a physical sidelink control channel (PSCCH), and the PSCCH comprises information of a resource selected by the first terminal;

control the transceiver to receive a second channel from a second terminal; and determine, based on the second channel, whether the first terminal can use the selected resource; and wherein the one or more processors are configured to:

if the resource selected by the first terminal overlaps with a resource selected by the second terminal, determining, based on that a service priority of the first terminal is higher than that of the second terminal, that the first terminal can use the resource selected by the first terminal for transmitting data or signaling; determining, based on that the service priority of the first terminal is lower than that of the second terminal, that the first terminal cannot use the resource selected by the first terminal to transmit data or signaling, wherein the service priority is a ProSe Per-Packet Priority (PPPP), wherein the one or more processors are further configured to:

when the first terminal cannot use the resource selected by the first terminal to transmit data or signaling, perform resource sensing and resource reselection.

8. The device of claim 7, wherein the PSCCH carries, through sidelink control information (SCI), the information of the resource selected by the first terminal.

9. The device of claim 7, wherein the one or more processors are further configured to:

if a service priority of the first terminal is the same as that of the second terminal, determine, when time of the first terminal for sending the first channel is earlier than that of the second terminal for sending the second channel, that the first terminal can use the resource selected by the first terminal to transmit data or signaling; or determine, when the time of the first terminal for sending the first channel is later than that of the second terminal for sending the second channel, that the first terminal cannot use the resource selected by the first terminal to transmit data or signaling.

10. The device of claim 7, wherein the first channel is a Physical Sidelink Shared Channel (PSSCH), and the PSSCH comprises the information of the resource selected by the first terminal.

11. The device of claim 10, wherein the PSSCH carries, through a Media Access Control (MAC) Control Element (CE), the information of the resource selected by the first terminal.

12. The device of claim 7, wherein the PSCCH comprising first indication information for indicating that a PSSCH corresponding to the PSCCH comprises the information of the resource selected by the first terminal.

13. The device of claim 7, wherein the one or more processors are configured to control the transceiver to send the first channel in a last transmission period prior to a target moment, the target moment indicating a moment at which service data reaches, or a moment at which a high layer generates the service data.

14. A non-transitory computer storage medium, having stored therein a computer executable instruction, wherein the computer executable instruction, when being executed by a processor, enables the processor to implement a resource reservation method, the method comprising:

sending a first channel, wherein the first channel is a physical sidelink control channel (PSCCH), and the PSCCH comprises the information of the resource selected by the first terminal;

receiving a second channel from a second terminal; and determining, based on the second channel, whether the first terminal can use the selected resource; and if the resource selected by the first terminal overlaps with a resource selected by the second terminal, when determining, based on that a service priority of the first terminal is higher than that of the second terminal, that the first terminal can use the resource selected by the first terminal for transmitting data or signaing;

when determining, based on that the service priority of the first terminal is lower than that of the second terminal, that the first terminal cannot use the resource selected by the first terminal to transmit data or signaling, wherein the service priority is a ProSe Per-Packet Priority (PPPP), the method further comprising:

when the first terminal cannot use the resource selected by the first terminal to transmit data or signaling, performing, by the first terminal, resource sensing and resource reselection.

\* \* \* \* \*